United States Patent
Bruning, Jr. et al.

[11] 3,714,569
[45] Jan. 30, 1973

[54] ELECTRONIC MEASURING INSTRUMENT WITH DIGITAL DISPLAY SCALE EXTENSION

[75] Inventors: Harry F. Bruning, Jr., Cornwall; William L. Blowers, Newburgh, both of N.Y.

[73] Assignee: Kollmorgen Corporation, Holyoke, Mass.

[22] Filed: May 28, 1970

[21] Appl. No.: 41,219

[52] U.S. Cl..................324/131, 324/99 D, 324/115, 340/347 AD
[51] Int. Cl........G01r 1/02, G01r 15/08, G01r 17/06
[58] Field of Search......324/121, 131, 115, 99, 99 D; 340/347 AD

[56] References Cited

UNITED STATES PATENTS

| | | |
|---|---|---|
| 3,383,594 | 5/1968 | Fiorletta et al. ...................324/131 |
| 3,132,338 | 5/1964 | Schmid ...................340/347 AD |
| 2,497,961 | 2/1950 | Shaw ...................324/131 X |

*Primary Examiner*—Rudolph V. Rolinec
*Assistant Examiner*—Ernest F. Karlsen
*Attorney*—Frederick E. Bartholy

[57] ABSTRACT

An electronic measuring system and instrument circuit is described having analog and digital components. The digital display is automatically actuated upon inputs exceeding predetermined ranges beyond the capability of the analog device and is combined with the reading of the analog indication.

8 Claims, 4 Drawing Figures

ELECTRONIC MEASURING INSTRUMENT WITH DIGITAL DISPLAY SCALE EXTENSION

This invention relates to electrical measuring systems, and, more particularly, to an electronic instrument in which a hybrid display, consisting of analog and digital components is provided, the components being interconnected by appropriate circuitry for automatic ranging and indication.

Instruments for measuring electrical values, such as current or voltage, in which either an analog device, such as a meter, or a digital device, such as glow tubes with numerical values provide the display for the measurement to be indicated, are well known in the art. In such instruments, switching means are often employed for extending the indication to various predetermined ranges.

Attempts have been made to indicate the particular range to which the measuring device is switched by means of a digital display. This is a convenient way for the user to be made aware of the particular meter range. Such digital indication of the range has also been combined with automatic range switching.

It is a primary object of this invention to provide an electrical measuring instrument having multiple ranges in which a hybrid display consisting of digital and analog components serves as a combined indication of the measured electrical quantity.

It is a particular feature of the invention that the various ranges to which the analog device is intended to respond are automatically switched in accordance with the input levels, and the digital display is simultaneously actuated to function as an integral part of the scale of the analog device.

It is a particular advantage of the invention that the instrument constructed in accordance therewith, aside from its automatic function, provides auxiliary current conductive means whereby the input impedance of the instrument is unaltered in all ranges of operation.

Other objects, features and advantages will be apparent from the following description of the invention, pointed out in particularity in the appended claims, and taken in connection with the accompanying drawings, in which:

Prior to referring to the figures, it is to be pointed out that an instrument in accordance with the invention may employ various types of analog devices having a scale and a pointer displaced with respect thereto. Most commonly it may use a standard moving-coil-type meter. The digital portion may be any type of numerical display device, either mechanical or electronic, such as a glow discharge tube having cathodes formed into numerals which glow under certain energized conditions. The important aspect which will be evident upon understanding the operation of the circuitry is that the two indications, namely, that of the meter pointer on the scale and the particular digit shown on the digital readout, are numerically combined, being an integral part of the total indication of the instrument. In the particular example herein shown, the digital indication appears as a first digit of the meter scale, the latter providing the additional digits of the total number. By suitable circuit modifications, in the automatic switching of the ranges, the digital display may serve as a multiplier for the scale of the analog device. In all instances, however, the two readings represent a unified display for direct reading of the quantity to be measured, in contradistinction to prior arrangements where the digital display is merely a signal to the observer, indicating the particular operating range of the analog device.

Figure 1:
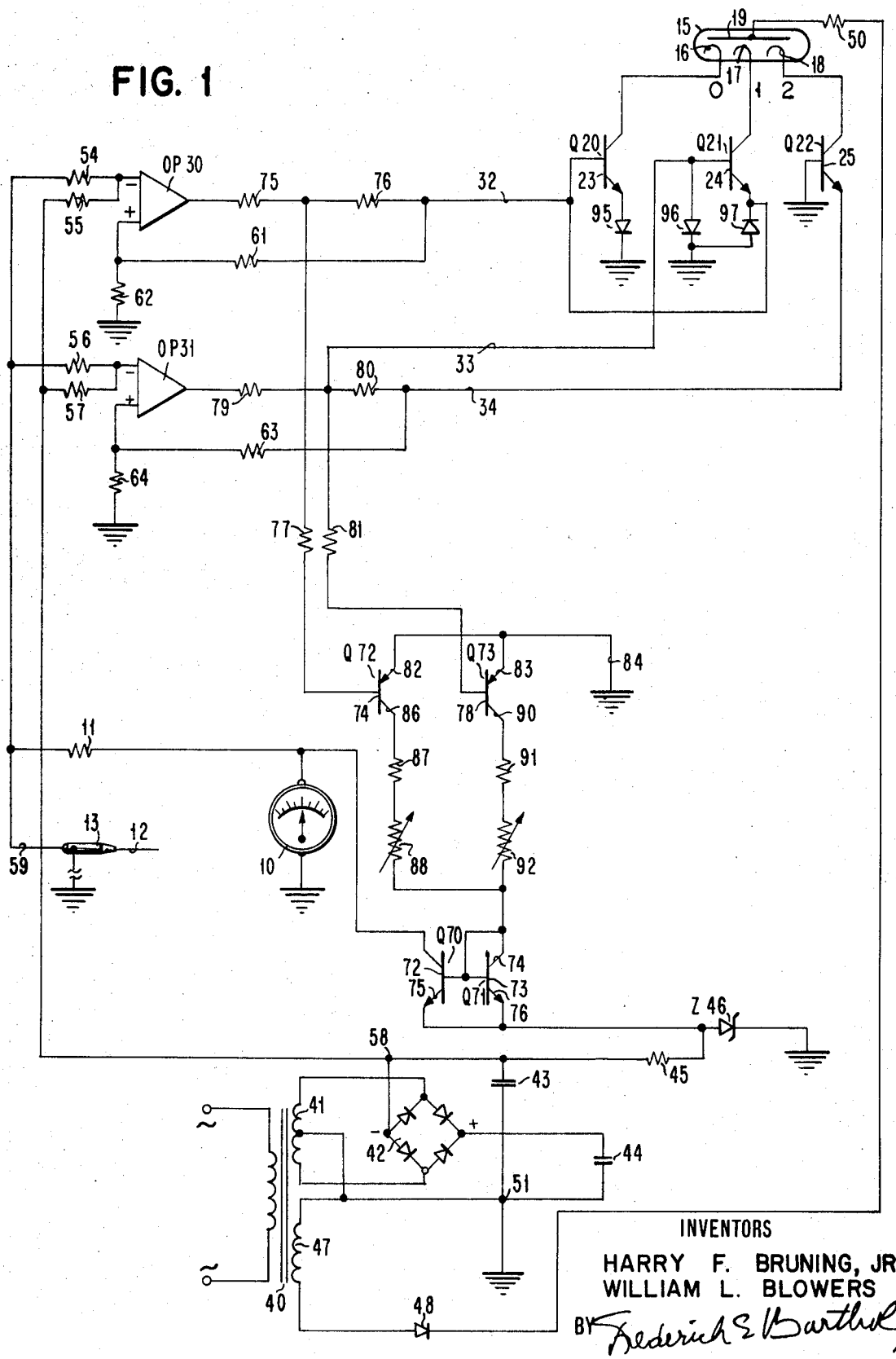
FIG. 1 is a schematic circuit arrangement showing the component elements of the circuitry interconnecting the digital display and the analog indicating element.

As an aid in considering FIG. 1, the circuit shown may be divided into six major functional assemblies:

1. The Analog Device.

This is a conventional meter 10 having the usual series resistor 11 for establishing its basic range. In direct current application, the meter 10 may be a moving-coil-type microammeter — well known in the art — so that further description thereof is not deemed necessary. As shown by way of example, the input of the meter consists of a probe 12 of which the outer or shielded portion 13 is grounded, thus completing the circuit to one terminal of the meter. The sensing portion connects to the resistance 11. A potential difference between ground and probe 12 would cause a deflection of the meter. The particular range at which such deflections would be maximum for a given input is determined by the value assigned to the resistor 11.

2. The Digital Display.

A gaseous discharge tube 15 is illustrated for this purpose. Such tubes are often referred to in trade parlance as "Nixie" tubes, and may have a total of ten cathodes, each having the configuration of a numerical digit and when selectively energized indicate the particular digit by glow discharge.

For the sake of simplicity, only three cathodes 16, 17 and 18 are shown with the common anode 19. This will give a three-range numerical display, namely, 0, 1, and 2.

Switching transistors Q20, Q21 and Q22 control current to cathodes 16, 17 and 18, respectively. The bases 23 and 24 of the transistors are connected to a control circuit by means of conductors 32 and 33. The emitter of Q22 is connected to the control circuit by means of conductor 34.

3. The Power Supply.

A conventional rectifier-filter type is shown. It furnishes three distinct sources of direct current. Secondary winding 41 of the transformer 40 is connected to full wave rectifier assembly 42 which, in combination with filter condensers 43 and 44, supplies operating potential to the various electronic components. A current path from the supply through a series resistor 45 and Zener diode Z46 to ground serves as a reference voltage source. The secondary winding 47, including rectifier 48 and resistor 50, supplies energizing potential to the anode 19 of the glow tube 15.

4. The Automatic Level Sensors.

Two operational amplifiers OP30 and OP31 perform this function. Operational amplifiers are used in various circuit configurations as conventional component elements in solid state circuitry. In the present application, as will be seen, amplifiers OP30 and OP31 are connected as regenerative bistable elements whose state depends on the amplitude of the input voltage. Such circuit configuration is generally referred to as a "Schmitt trigger" and serves the purpose of signal level actuated selective switching elements. In this circuit arrangement, the positive or non-inverting input of both amplifiers has ground as a reference point. For the negative or inverting input, a voltage divider is provided, comprising resistors 54 and 55 for amplifier OP30 and resistors 56 and 57 for amplifier OP31. Resistors 55 and 57 return to the negative side of the power supply at 58 and resistors 54 and 56 are joined and terminate at 59, to which the meter probe is connected.

A feed-back network from the output of OP30 to its non-inverting input is provided by resistors 61 and 62 and for OP31 by means of resistors 63 and 64.

The function of amplifiers OP30 and OP31 is threefold: (a) to sense the input levels when probe 12 is connected to a voltage source to be measured; (b) to initiate conductivity of the particular switching transistors Q20, Q21 and Q22 for actuating the glow discharge of a particular cathode; and (c) to control the current conductivity in a "current sink" in order to divert current from the meter 10 in excess of its basic range.

5. The Current Sink.

In order to maintain the input impedance of a meter, such as the meter 10, unaltered for the various ranges above that of its basic range, ordinary shunt elements for diverting current cannot be employed inasmuch as the effective input impedance would be lowered by the shunt path provided. However, in accordance with the present invention, circuit elements consisting of transistors Q70 and Q71, interconnected in such manner that a fixed relationship exists between collector current and base voltage, perform this function. As the base voltage is increased, the collector current will increase a proportional amount. In addition, the common terminal of the bases is connected to collector element 74 of transistor Q71. The emitters 75 and 76 of Q70 and Q71 are also connected together and return to the voltage reference provided by Zener diode Z46.

In this circuit configuration, assuming that transistors Q70 and Q71 are matched, their collector currents will always be equal and, by virtue of the base connection to the collector of Q71, these transistors will track each other, establishing a definite predetermined current flow upon forward biasing of the bases. In practice, transistors Q70 and Q71 would be part of an integrated circuit and hence have the required matched characteristics. When transistor Q70 and Q71 is conducting, current flow is initiated from the reference source and, as will be seen upon considering the operation of the circuit, this current will flow through the winding of the meter 10 in opposition to that of the current due to input circuit excitation.

Completing the description of the circuit, the control of the conductivity of the current sink from the output of amplifiers OP30 and OP31 is effected by switching transistors Q72 and Q73. The base 74 of Q72 connects to the junction point of resistors 75 and 76 in the output circuit of amplifier OP30 through series resistor 77. Similarly, the base 78 of Q73 connects to the junction point of resistors 79 and 80 in the output circuit of amplifier OP31 through series resistor 81. Emitters 82 and 83 of transistors Q72 and Q73 respectively return to ground by means of conductor 84. Collector 86 of Q72 connects to collector 74 of Q71 by means of resistor 87 and variable resistor 88 in series. Similarly, collector 90 of transistor Q73 connects to collector 74 through resistor 91 and variable resistor 92 in series.

6. The Glow Tube Drive Transistors.

As mentioned before, transistors Q20, Q21 and Q22 perform the control function for energizing of the cathodes 16, 17 and 18, respectively. Consequently, these electrodes are connected to the collectors of the respective transistors. The emitters thereof return to ground either directly, as that of Q22, or through suitable diodes 95 and 96 which serve the purpose of limiting reverse bias under certain operating conditions.

Operation of the Circuit

For the sake of simplifying the understanding of the operation of the circuit, let us assume that the indicating meter 10 is a 100 microammeter and resistor 11 is selected to provide the desired meter sensitivity, namely, full scale deflection at 1 volt input. Also assuming that 0.5 volt is applied to the probe 12, the meter pointer will indicate 0.5 on the scale.

Figure 2:
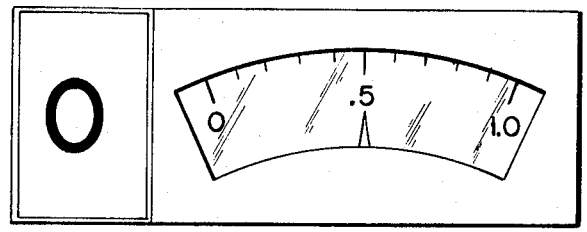
FIG. 2 is a pictorial representation of the hybrid display as it appears for the lowest or basic range of the analog device.

In the basic range of 0 to 1 volt, Q20 is forward biased by the output current of amplifier OP30 and the cathode 16 of glow tube 15 is thus conductively connected to ground. By virtue of the anode voltage from the power supply, a glow discharge takes place so that the cathode 16 will indicate the numeral 0. This condition is shown in FiG. 2, the physical arrangement being such that the digital indication is adjacent to the meter scale.

When the input voltage is increased beyond 1 volt, e.g., 1.5 volts, the change in input level is sensed by amplifier OP30 which removes base drive from Q20. The output current of amplifier OP30 will now trigger Q72 into conductivity, placing such bias on Q70 as to initiate current flow from the reference voltage source Z46 through the winding of the meter 10 to ground. This current is of a fixed value of 100 microamperes and of such polarity through the meter coils that the indication of the meter remains at 0.5. However, the cathode 16 of glow tube 15 is now switched off and cathode 17 becomes conductive due to current in Q21 initiated by emitter drive from OP30.

Figure 3:
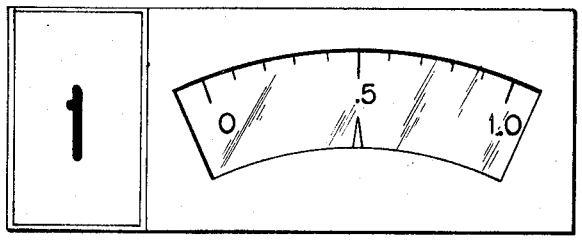
FIG 3 is similar to that of FiG. 2, showing the indication for the next higher range of the instrument.

The resultant indication of the meter is shown in FIG. 3, the numeral 1 to the left of the scale being an integral part so that the meter will read 1.5 volts.

Figure 4:
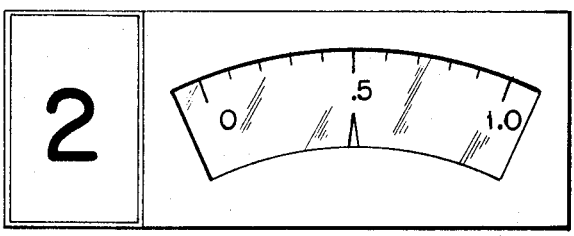
FIG 4 illustrates the indication for the third range of the instrument.

Wen the input voltage is further increased beyond 2 volts, this level switches OP31 to a negative output condition. Q73 is now switched, causing conductivity in Q71, proportioned to be 100 microamperes, by means of adjustment of variable resistor 92. The total current flow in the current sink is now 200 microamperes from the reference source Z46 so that the meter indication remains at 0.5 volt. However, cathode 18 of the discharge tube 15 will now be energized due to the switching on of Q22 from the output of OP31 and the glow discharge will indicate the numeral 2. This condition is shown in FIG. 4, the reading of the scale being 2.5 volts.

Level sensing of the operational amplifiers is critical at the operating point of 1 volt for OP30 and 2 volts for OP31, so that when the input voltage is either exactly 1 volt, or 2 volts, the amplifiers OP30 and OP31 will drift and switching conditions will be unstable. In order to prevent this, the feedback circuit, consisting of resistors 61 and 62 for OP30 and resistors 63 and 64 for OP31, provides a hysteresis condition that eliminates uncertain level detection and insures positive switching of OP30 and OP31, even if the input voltage is exactly 1 volt or 2 volts. The feedback condition adding the hysteresis places a difference in down-range and up-range switching points. This is easily overcome by having additional scale markings above and below the ends of the scale on the meter face.

Summing up the operation for the three ranges of input voltages, namely, 0 to 1; 1 to 2; and 2 to 3 volts, when the input voltage is between 0 to 1 volt, neither level detector OP30 nor OP31 will switch its output because of the insufficient input level. Since the base 23 of the transistor Q20 is tied to the output of OP30 through resistors 75 and 76, it will turn on the zero numeral, namely, cathode 16 of the glow tube 15. Since the base 24 of Q21 is tied to the output of OP31 through resistor 79, the base 24 would be clamped by diode 96. However, since its emitter is tied to the base 23 of Q20, transmitter Q21 is reverse biased and will not be conducting. Transistor 22 will be off since its emitter is connected through resistors 80 and 79 to the output of OP31. This creates a reverse bias on Q22.

When the input voltage to the circuit is between 1 and 2 volts, the output of OP30 is switched and base drive is removed from Q20 which turns off the zero indication of the blow tube 15. Since the emitter of Q21 is connected to the same point, it will turn on by emitter drive, causing the numeral 1 in the glow tube to turn on. Q22 will not be affected since level detector OP31 is set for a higher input voltage which has not been exceeded at this time.

When the input voltage to the circuit is between 2 and 3 volts, both level detectors OP30 and OP31 will switch their outputs so that Q20 and Q21 are reverse biased and Q22 is switched on which, in turn, causes the numeral 2 in the discharge tube 15 to glow.

The invention in its broader aspects is not limited to the specific embodiment herein shown and described but departure may be made therefrom within the scope of the accompanying claims without departure from the principles of the invention and without sacrificing its chief advantages.

What is claimed is:

1. In an electronic measuring system, a meter having a scale of fixed range for the analog display of electrical quantities within said range, an input circuit having a predetermined impedance across said meter, digital displays associated with said scale, electronic sensing means responsive to input magnitudes exceeding said fixed range associated with said circuit, means responsive to the operation of said sensing means for initiating the actuation of certain of said digital displays means for generating in a first path a current representative of the state of the sensing means, and means duplicating the current magnitude in the first path in a second path coupled across the meter in a manner to apply the current in a direction opposite the direction of the current applied to the meter by the input circuit whereby said impedance remains substantially unaltered and said digital display and said analog indication are combined for the measurement of said quantity.

2. An electronic measuring system in accordance with claim 1 wherein said sensing means comprises a plurality of level detectors connected to said input circuit, said detectors being selectively biased for switching action upon input levels exceeding predetermined magnitudes.

3. An electronic measuring system in accordance with claim 1 wherein said means for generating comprises a source of fixed potential, and a plurality of parallel current conductive elements in series with said source of fixed potential, each conductive element when conducting initiating a current flow of fixed magnitude in said first path and in said second path, whereby a resulting current is applied across said meter in opposition to the current flow in said meter originating in the input circuit, and switching means selectively controlling said conductive elements in accordance with operation of said sensing means in response to potentials exceeding said range being impressed across said input circuit.

4. An electronic measuring system in accordance with claim 1 wherein said digital display comprises a glow tube having a common anode and a plurality of cathodes forming numerals, a source of potential for said anode and switching means for each of said cathodes, said switching means being selectively controlled by the operation of said sensing means.

5. A hybrid display electrical measuring instrument including, in combination:
 a. a meter having a scale, a pointer and a coil for actuating said pointer, said meter functioning as the analog display of said instrument;
 b. a gaseous discharge tube having an anode and a plurality of cathodes, each forming a numeral visible upon creating a glow discharge between said anode and any of said cathodes, said discharge tube representing the digital display of said instrument;
 c. an input circuit for said instrument including an impedance element and said coil in series between a pair of input terminals, said circuit determining the basic range of said instrument;
 d. a plurality of operational amplifiers, each having an input circuit effectively connected across said terminals, and an output circuit;
 e. biasing means for each of said amplifiers predetermining the level of input potential for responsive actuation determining additional ranges of said instrument;
 f. a switching element associated with each of said cathodes and connected to the output circuit of respective amplifiers for energizing a cathode upon response of an amplifier due to a predetermined level of input potential;

g. a source of fixed potential, current conductive means of fixed current magnitude between said input circuit and said source of potential, operable for producing a current flow in said coil in opposition to currents tending to actuate said coil due to input potentials between said terminals exceeding said basic meter range;

h. switching means between the output circuit of said operational amplifiers and respective current conductive means for initiating current conductive action in accordance with the operation of any one of said amplifiers at input potentials exceeding said meter range whereby said digital display represents the ranges of said instrument in addition to and beyond said basic range.

6. A hybrid display electrical measuring instrument in accordance with claim 5 wherein operational amplifiers are connected in a regenerative bistable mode for the detection of predetermined input levels.

7. A hybrid display electrical measuring instrument in accordance with claim 5 wherein said current conductive means comprise the collector current path of a pair of junction transistors having bases tied together and connected to one of the collector electrodes.

8. A hybrid display electrical measuring instrument in accordance with claim 5 wherein the current configuration is such that each digit of said display is additive to said scale, thereby extending said basic range.

* * * * *